United States Patent [19]

Kaplan

[11] Patent Number: 5,721,939
[45] Date of Patent: Feb. 24, 1998

[54] METHOD AND APPARATUS FOR TOKENIZING TEXT

[75] Inventor: Ronald M. Kaplan, Palo Alto, Calif.

[73] Assignee: Xerox Corporation, Stamford, Conn.

[21] Appl. No.: 510,626

[22] Filed: Aug. 3, 1995

[51] Int. Cl.⁶ .............................. G06F 17/20; G06F 17/28
[52] U.S. Cl. .................. 395/759; 395/759; 395/751; 395/752
[58] Field of Search .............................. 395/759, 752, 395/751

[56] References Cited

U.S. PATENT DOCUMENTS

| | | | |
|---|---|---|---|
| 5,323,316 | 6/1994 | Kadashevich et al. | 395/759 |
| 5,438,511 | 8/1995 | Maxwell, III et al. | 395/751 |
| 5,477,451 | 12/1995 | Brown et al. | 395/759 |
| 5,510,981 | 4/1996 | Berger et al. | 395/752 |
| 5,594,641 | 1/1997 | Kaplan et al. | 395/601 |

FOREIGN PATENT DOCUMENTS

06332718 A  12/1994  Japan.

OTHER PUBLICATIONS

Dialog File 88, Acc. No. 02265811: "Literate Programming: Weaving a Language–Independent Web," Van Wyk, *Communication of the ACM*, v. 32, No. 9, p. 1051 (5), Sep. 1989.

"Regular Models of Phonological Rule Systems", Ronald M. Kaplan et al., Computational Linguistics, vol. 20, No. 3.

"A Finite–State Architecture for Tokenization and Grapheme–to–Phoneme Conversion in Multilingual Text Analysis", Richard Sproat, From Text to Tags: Issues in Multilingual Language Analysis. Proceedings of the ACL SIGDAT Workshop. Mar. 27, 1995, Dublin, Ireland.

"A Stochastic Finite–State Word–Segmentation Algorithm For Chinese", Richard Sproat et al., 32nd Annual Meeting of the Association for Computational Linguistics. Jun. 27, 1994. Las Cruces, New Mexico.

*Primary Examiner*—Donald E. McElheny, Jr.
*Assistant Examiner*—Joseph Thomas
*Attorney, Agent, or Firm*—Oliff & Berridge, P.L.C.

[57] ABSTRACT

An efficient method and apparatus for tokenizing natural language text minimizes required data storage and produces guaranteed incremental output. Id (text) is composed with a tokenizer to create a finite state machine representing tokenization paths. The tokenizer itself is in the form of a finite state transducer. The process is carried out in a breadth-first manner so that all possibilities are explored at each character position before progressing. Output is produced incrementally and occurs only when all paths collapse into one. Output may be delayed until a token boundary is reached. In this manner, the output is guaranteed and will not be retracted unless the text is globally ill-formed. Each time output is produced, storage space is freed for subsequent text processing.

24 Claims, 16 Drawing Sheets

METHOD AND APPARATUS FOR TOKENIZING TEXT

BACKGROUND OF THE INVENTION

1. Field of the Invention

This invention relates to a method and apparatus for tokenizing text. In particular, this invention is directed to techniques for breaking a stream of natural language characters into meaningful subunits. The method is applicable to all natural languages.

2. Background of the Related Art

Before any text processing can be performed on a document, the text must be broken up into distinct and meaningful units. This "tokenizing" of text would be easy to accomplish in a perfectly punctuated language. Each meaningful unit or "token" would be delimited from other meaningful units by a particular character or other symbol. Although written English is a well-punctuated language, it contains ambiguities that will result in multiple tokenization options for dividing one meaningful unit from adjacent meaningful units.

Two examples generally illustrate the ambiguities that arise in written English. A first example occurs when a single meaningful unit comprises two words separated by a space. Generally, in written English, a word delimited by a space on each side is a single meaningful unit. In the case of some proper nouns, this general rule fails. Names such as "General Motors" and "Key West" fall into this category. Sequences of words other than proper nouns can also cause this rule to fail. For example, in phrases such as "jack rabbit", "to and fro" and "a priori", the combination of two or more words has a meaning separate from its individual component words. Indeed, some of the components may not even exist as independent words (e.g. priori and fro).

A second example in written English occurs when a period is detected. A period may delineate the end of a sentence, an abbreviation, or both the end of a sentence and an abbreviation. For example, "Jan." may be a person's name at the end of a sentence or an abbreviation for the month of January. The expression also may represent an abbreviation for the month of January at the end of a sentence. Similarly, "chap." may be taken either as the word "chap" appearing at the end of a sentence, or as the abbreviation for chapter anywhere within a sentence.

Such ambiguities become critical in certain text processing applications. For example, in computer applications using a mouse, a user may click the mouse in a number of sequences to select a block of text. For example in some applications, if the mouse is clicked once, a word will be selected; if clicked twice, a sentence will be selected; and after three clicks, a paragraph is selected. Employing this application, a user wanting to select a multi-word phrase in its entirety, such as "a priori", will select only the word "a" when single-clicking or the whole sentence when double clicking. Alternately, a user wishing to select a sentence may select a segment of text ending with an abbreviation, such as "Jan."

Another text processing operation in which tokenization is critical is a search and retrieval operation. A user may want to search for a given word. If the word has an attached period in the text because it comes at the end of a sentence, it will not be found by an exact string match. Additionally, if the word is part of a compound word, it will be retrieved even though it is not appropriate for retrieval. The system will retrieve all such occurrences even if all such occurrences are not desired by the user.

Because these and other types of difficulties are infrequently encountered in processing written English, the problem is often ignored. The problem is more severe in other languages and cannot be ignored. In written Chinese, the characters within a sentence are not separated by punctuation or white space and token boundaries are more difficult to discern. A period punctuates each sentence. However, many tokenizations into separate meaningful units are possible between periods, as each character in written Chinese is separated by an essentially equivalent amount of white space, while a single word may comprise two or more separated characters.

Commonly, strings of characters have been tokenized merely by recognizing spaces and punctuation. As explained above relative to written English, this approach may lead to an inaccurate tokenization. When applied to written Chinese, such an approach would yield token boundaries only for complete sentences. No token boundaries would exist within sentences. This tokenization would be entirely inaccurate.

Methods previously applied to written Chinese generally include statistical approaches that take into account the probabilities associated with each of the various possible tokenizations. These statistical approaches can also incorporate lexical knowledge, such as a dictionary.

Another known approach, the "depth-first" approach, applies tokenization rules to a segment of text. Commonly, in this approach, one path of possible tokenization is selected from a first text character. If this path fails, the process begins again with the first text character. This approach is cumbersome because it frequently leads to output that is either later retracted or is delayed until a correct path is finally and unambiguously determined, possibly only after the whole of a long text has been processed. The approach can also require excessive storage space, depending upon the particular chosen path. As a path is extended, backtracking storage must be allocated so that the process can recover if the first chosen path later turns out to be incorrect. If the path is correct and continues to the end of the text, the storage requirements can be prohibitive. This prior art does not allow for incremental output because the path may later become incorrect. Therefore a client has to wait until the whole text has been processed before it can operate on any part of the text.

The formula evaluated in the present invention is effectively the same as a related formula provided by Sproat in "A Finite-State Architecture for Tokenization and Grapheme-to-Phoneme Conversion in Multilingual Text Analysis," From Text to tags: Issues in Multilingual Language Analysis, Proceedings of the ACL SIGDAT Workshop, Mar. 27, 1995, Dublin, Ireland. However, Sproat does not describe a process for evaluating the formula and presumes that its evaluation can be accomplished by the usual or conventional implementations of the finite state calculus. In particular, since he is only concerned with applying this formula to individual sentences and not a complete long text, contrary to the present invention, Sproat is not concerned with efficiency issues. Sproat talks about weighted transducers and selecting the best path through the whole process. The present invention can also be extended to select the best path in an incremental fashion, because it determines the concatenation of the best paths through all of the pinch points.

SUMMARY OF THE INVENTION

This invention provides a method for tokenizing text by advancing on a character-by-character, or breadth-first, basis, by determining all possible tokenizations for the text up to a given character position, and for outputting all correct tokenizations when all of them are compatible with the text after that character position.

The tokenization rules for a language are encoded in a finite state transducer, and this invention provides a particularly efficient method for applying such a transducer to a text.

This invention obviates the difficulties encountered with previous tokenization methods. By taking advantage of the particular characteristics of text, the disclosed method produces accurate incremental output without using excessive storage space.

An important characteristic of text for the purposes of this invention is its acyclic nature. The acyclic nature of text renders large amounts of storage unnecessary during traversal of the text characters. In this invention, once all transducer transitions extending from a current text position have been processed and a new current text position is determined, no remaining need exists for returning to any old text positions. Therefore, any information relating to the old text positions need not be retained in storage.

The acyclic nature of text makes particularly attractive a breadth-first traversal of the text. All of the tokenization paths leading up to a character are determined before advancing to the next character position. This is in direct contrast to the known, depth-first method of pursuing only a single path across all character positions and later returning to a previous character position to analyze another path.

The breadth-first process continues at least until a pinch point is reached. A pinch point is defined as a character position where all tokenization paths to that point can be extended in exactly the same ways. At such a character position, all previous tokenization ambiguities are compatible with all subsequent tokenizations. After reaching a pinch point, storage associated with the prior character positions is no longer necessary and the tokenizations from the previous pinch point to the current pinch point can be produced as output.

A pinch point may or may not coincide with a boundary between meaningful units. Output can be produced at a pinch point in the middle of a meaningful unit, in which case the client must buffer the output and wait until a boundary is reached before the client can perform any further processing. Alternatively, producing the tokenization output can be delayed until a pinch-point and a boundary between meaningful units, a token boundary, are simultaneously reached. The tokenization output can be more useful if delayed in this manner because the client can immediately operate on the output it receives without doing any buffering. In the above-described method, an accurate incremental tokenization output is produced. The tokenization output includes all possible correct tokenizations of a string of characters between pinchpoints. The tokenization output will generally be constructed as a finite state machine. However, it is also possible to output the complete set of tokenized strings.

Each time tokenization output is produced, it is guaranteed to be correct and complete for the particular string of characters examined so far, although the text as a whole may later prove to be globally ill-formed, for example, because it has unacceptable punctuation patterns.

BRIEF DESCRIPTION OF THE DRAWINGS

The invention will be described in detail with reference to the following drawings, in which like reference numbers refer to like elements and wherein.

DETAILED DESCRIPTION OF THE PREFERRED EMBODIMENTS

Figure 1:
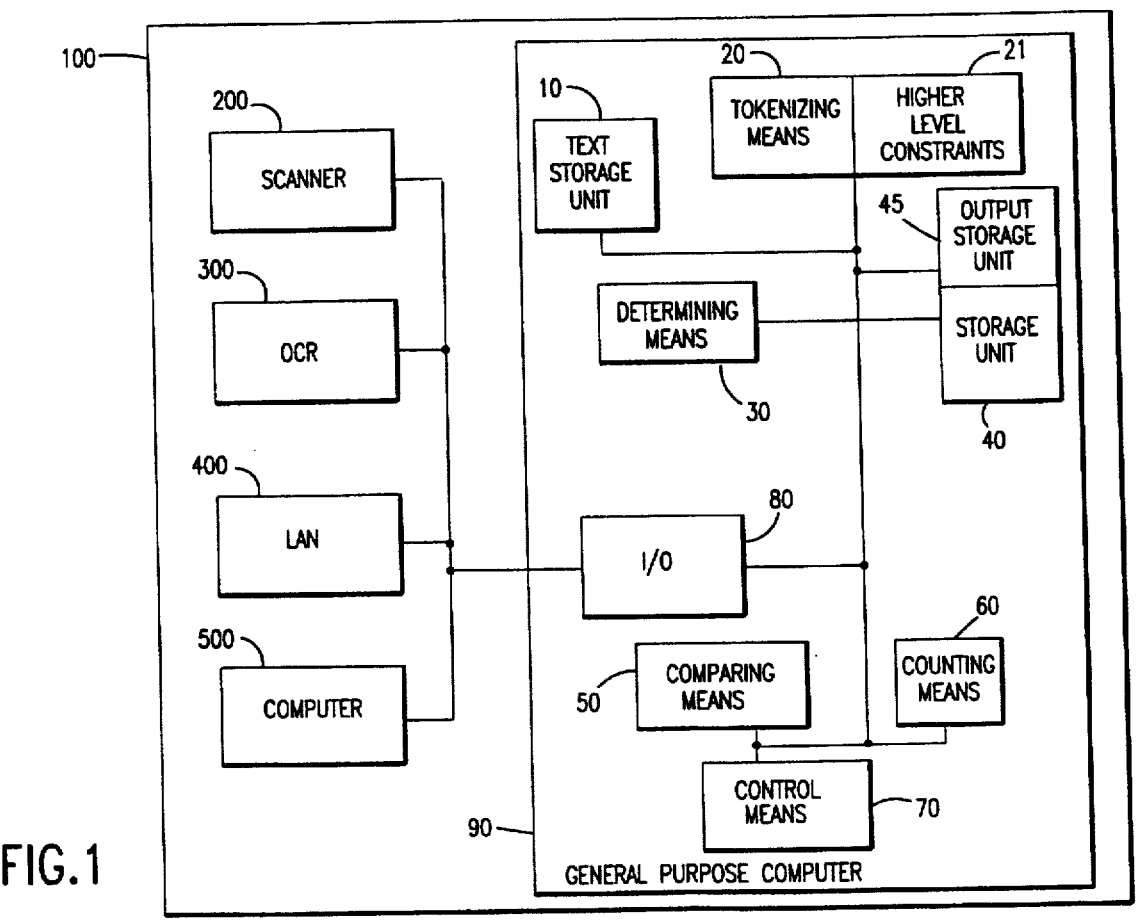
FIG. 1 is a block diagram of a preferred embodiment of an apparatus for the method of tokenizing text of this invention.

The method of this invention includes techniques for evaluating the expression set forth in equation (1):

$$\text{Dom}(T \circ \text{Id}(\text{text})) \quad (1)$$

where "text" is the text to be tokenized and "Id(text)" is the identity relation that pairs the text with itself. T represents the tokenizing relation, an infinite set of pairs, each one of which consists of a tokenized string and a corresponding text string that expresses it. T may be defined by a collection of rules, for example, those set forth below. The o in formula 1 stands for the familiar composition operator of the relational calculus. The domain "Dom" of the relation (T o Id(text)) is exactly the set of tokenized strings that T would express as the given text. The range of the expression consists of the surface text itself. These and other relevant operators are described in Kaplan and Kay, "Regular Models of Phonological Systems", Computational Linguistics, Volume 20, #3, September 1994, hereby incorporated by reference.

A language is a set of strings of characters. A language is regular if it can be built from a finite set of strings using the union, concatenation and Kleene closure operators. A regular language, as is well known, can be accepted or represented by a finite state machine. A string relation is a set of ordered pairs of strings. A string relation is regular if it can be built from pairs of strings using the union, concatenation and Kleene closure operators. A regular string relation can be represented or accepted by a finite state transducer. (See Kaplan and Kay for discussion). The tokenizing relation is assumed to be a regular relation and the text is interpreted as a single-string regular language. Id(Text) is therefore known to be a single-pair regular relation. As is well known, finite state machines and transducers can both be represented as graphs, where the nodes are called states, edges are called transitions, and a pair of strings is accepted if there is a path from a distinguished start state to one of the distinguished final states such that the labels of the transitions on that path match against the characters of the string or pair of strings. The difference between a finite state machine (fsm) and a finite state transducer (fst) is that the transition labels for an fsm are singleton characters and the labels for an fst are pairs of symbols. For the details of these representations see Kaplan and Kay and the references cited therein. The composition operator in formula 1 is usually evaluated by operating on a finite-state transducer accepting T and a finite state transducer accepting Id(text). The composition method is normally a quadratic operation bounded by the product of the number of states of its two operand transducers (in this case "T" and "Id(text)").

The composition operation produces an output transducer with states corresponding to pairs of states of the "T" and "Id(text)" transducers, with the transitions from the pair-states encoding the moves between them. An indexing structure must be maintained, while this operation is being performed, so that the data-structure representing a given pair-state can be obtained if that same pair of states is reached on alternative paths through "T" and "Id(text)". In this event, the same future moves are valid on all paths and this is represented by merging those paths together into a single pair state. If the merger is not performed, the operation may not terminate on cyclic input transducers. The operation is therefore generally impractical because it may require an amount of indexing storage that is proportional to the length of the text. However, based on the acyclic nature of the text, the method of this invention is able to use storage space efficiently.

In the method of this invention the tokenizing patterns of a language are defined in terms of a regular relation "T". "T" maps any tokenized-text, which has boundaries explicitly marked, into a concrete string of characters and punctuation marks that is a proper expression for the sequence of tokens.

In one embodiment, T is defined by a set of rules that denote regular relations. The following set of obligatory rewriting rules defines a regular relation that gives a first-approximation account of English punctuation conventions:

a. .→epsilon/_|.
b. |→epsilon/_punctuation
c. space→white-space+
d. |→white-space+

The general form of these context sensitive rewriting rules is input→output/left_right, where input, output, left, right can denote arbitrary regular languages.

When an ordered family of two or more rules is provided, the first rule is applied to a given string, the second rule is applied to the output of the first rule, the third rule is applied to the output of the second rule and so on. Kaplan and Kay show how to convert a family of such rules into an equivalent finite state transducer.

When such a rule is applied to a string, any substring of that string belonging to the input language is rewritten as a string in the output language provided that substring appears between substrings belonging to left and substrings belonging to right. Either or both of the contexts, left or right, can be omitted, indicating that no matching requirement is imposed. In the above rules, "|" represents a token boundary that divides meaningful units from one another. Epsilon represents the empty string. Characters mapped to epsilon are deleted. "Space" represents the internal space of a multi-component word. "White-space+" designates a sequence of one or more white-space characters (for example space, carriage return, tab). As evident from the above explanation, rule (a) deletes an abbreviatory period when it comes before a sentence-final period. Rule (b) causes token boundaries to be deleted in front of punctuation. Rule (c) converts the internal spaces of a multi-component word to an arbitrary sequence of white-space characters. Rule (d) transforms any remaining token boundaries to white space.

The above outlined rules are merely exemplary. Other rules could be added to deal with optional end-of line hyphenation, sentence-initial capitalization, and word-initial punctuation in addition to or instead of word-final/punctuation. Higher level information can be combined with these rules. For example, in English, the tokenizer "T" could include the list of all compound words with internal spaces and the list of acceptable abbreviations, and a prohibition against spaces or periods appearing in any other meaningful unit.

The tokenizer (i.e. tokenizing transducer) operates as follows. Given a tokenized string of text such as that shown in tokenized string (A):

Happily|,|he|saw|the|jack rabbit|in|Jan.|. (A)

the tokenizer maps the tokenized text into actual text, as shown in string (B):

Happily, he saw the jack rabbit in Jan. (B)

However, tokenized string (A) is not the only tokenized string that maps onto actual text string (B). Other tokenized strings, including at least (C) and (D), produce the same result as tokenized string (A):

Happily|,|he|saw|the|jack|rabbit|in|Jan|. (C)

Happily|,|he|saw|the|jack rabbit|in|Jan|. (D)

Therefore, the method of this invention in effect takes the inverse of "T" to map the concrete text into its various tokenized forms. For example, the expression given in string (B) produces all three of the tokenized strings (A), (C) and (D) among its tokenization outputs. The tokenization output can be produced in the form of a finite state machine.

Figure 5:
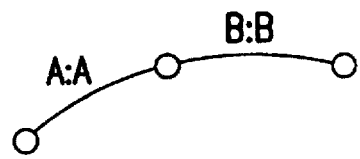
FIG. 5 illustrates a finite state transducer for the character string "AB"

Of course it is very inefficient to build as an explicit data structure, a finite state transducer that represents Id(text) as formula 1 seems to require. But, text character strings can be interpreted as if they were an explicit data structure. Each character position is interpreted as a state and each character can be its own identity pair. Thus a string "AB" is interpreted as the finite state transducer in FIG. 5. On the left side of the colon, the label is the domain character, and the right side is called the range character.

Figure 6A:
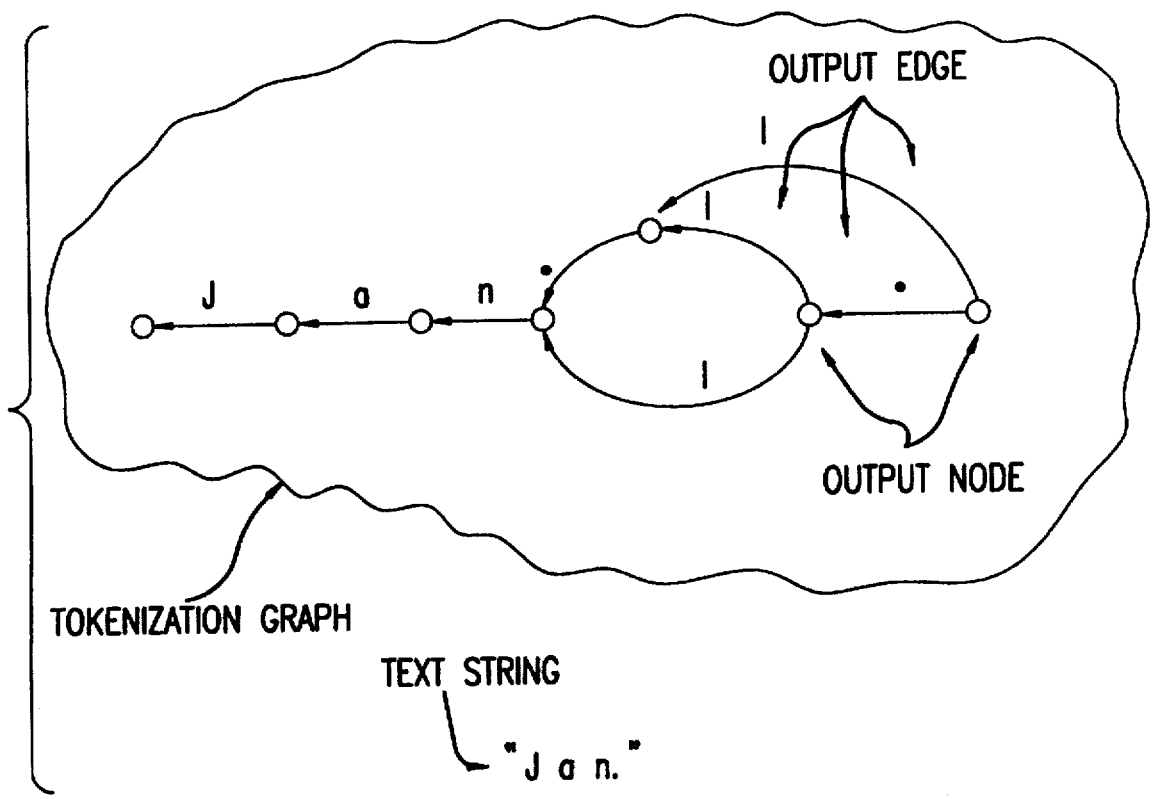
FIG. 6(a) is a diagram illustrating a sample output in the form of an output graph and FIG. 6(b) illustrates the corresponding fininte state machine.
Figure 6B:
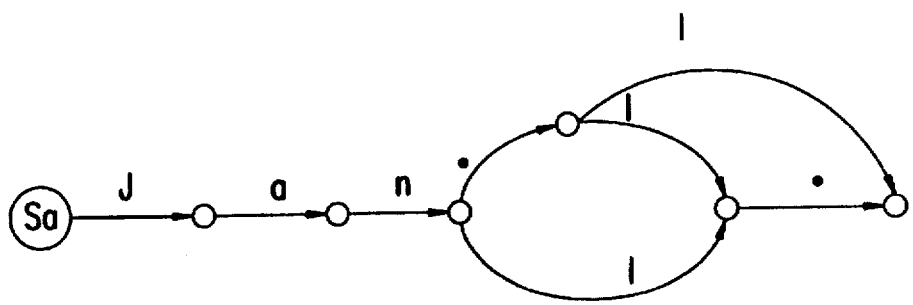

In general, text is acyclic and non-branching, and this is what allows for an efficient breadth-first implementation of the composition operation. The output storage unit 45 stores the output produced from all the paths in the transducer T that were traversed to reach a current character position, and each path is paired with a state in T that indicates how that path can be extended. The output is stored as a directed graph having nodes and edges. For example, FIG. 6(a) shows what the output graph would be after tokenizing the string "Jan.". Note that there is a simple transformation between an output graph of this form and a conventional finite-state machine that would represent the identified token sequences. The states of the finite-state machine correspond to the nodes of the output graph and the transitions of the finite-state machine correspond to the edges of the output graph with the difference that if an edge leaves a node x and enters a node y, the corresponding transition will leave the state corresponding to y and enter the state corresponding to x. The start-state of the fsm will be the state corresponding to the initial node of the output graph (the left-most one in FIG. 6a) and the final fsm state will correspond to the last node that the tokenizing process adds to the graph (the right-most one in FIG. 6a). FIG. 6(b) shows the finite state machine corresponding to the output graph in FIG. 6(a).

Figure 7:
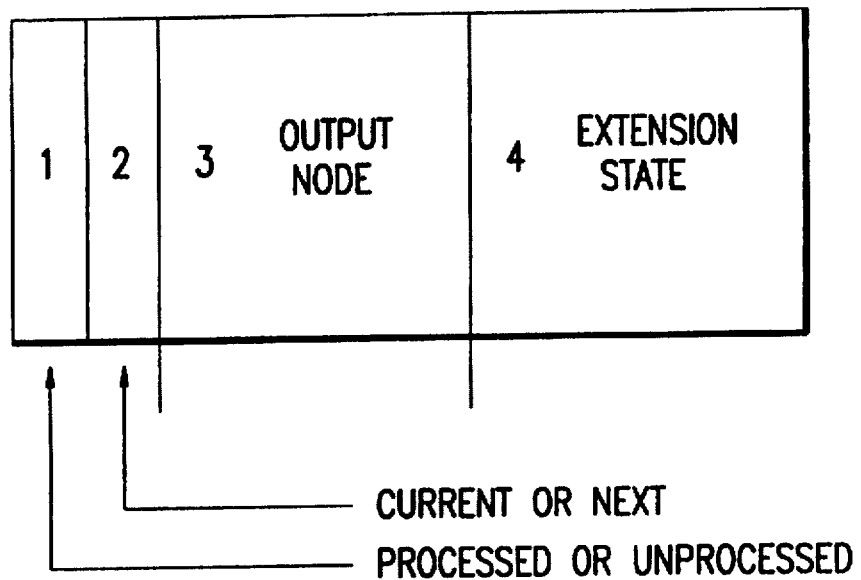
FIG. 7 is a block diagram illustrating a configuration.

FIG. 7 is a block diagram that illustrates the storage of a configuration. The configuration includes a designation of "processed" or "unprocessed" at 1, a designation of "current" or "next" at 2, an output node 3 and extension state 4. Although shown as fields, the configurations could also be maintained by list processing techniques of a familiar sort. The breadth-first composition is implemented by simply maintaining a collection of configurations that pertain to the current text position and another collection of configurations that pertain to the next text position.

Figure 2:
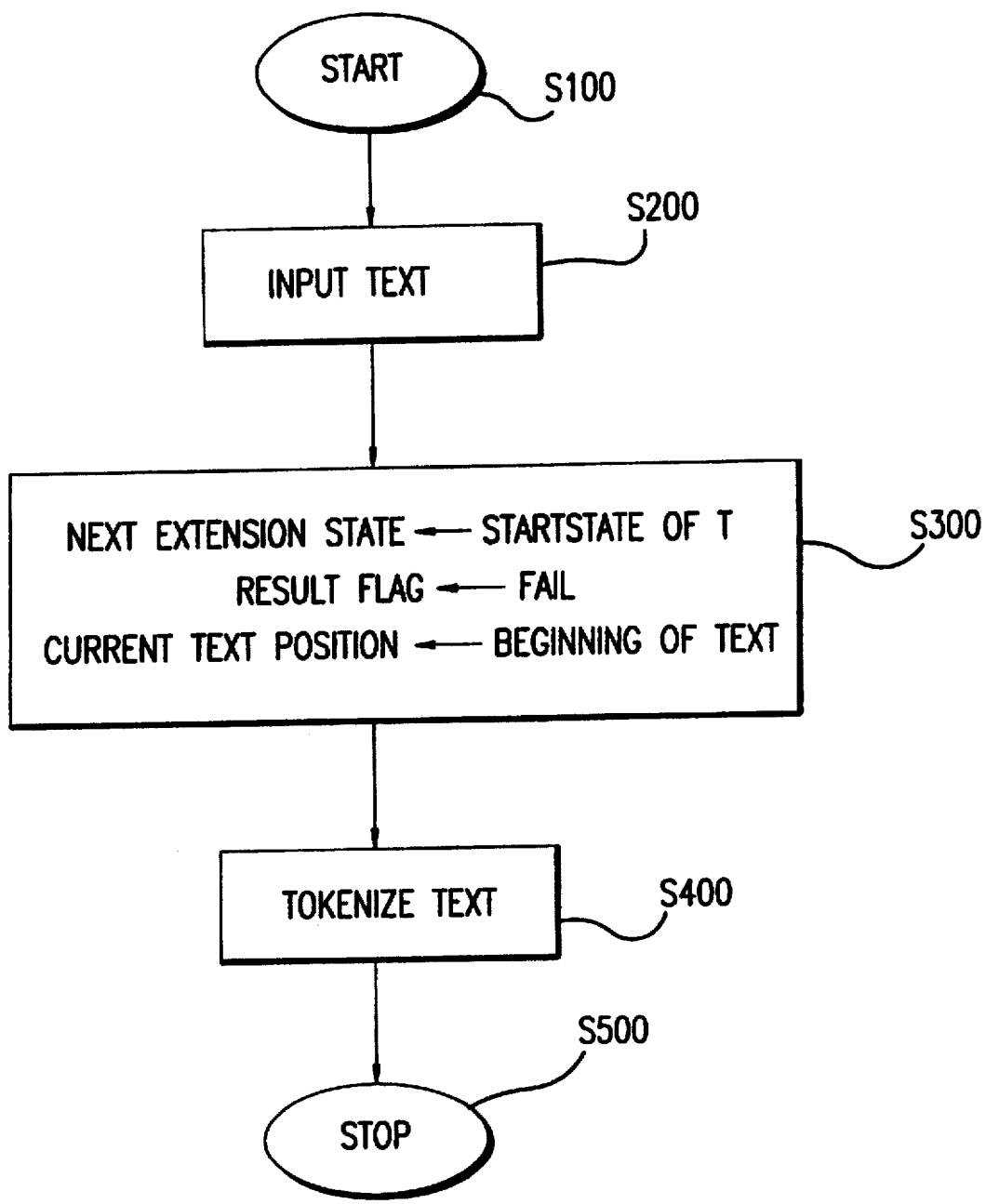
FIG. 2 is a flow chart outlining the basic steps of a method of the present invention.
Figure 3:
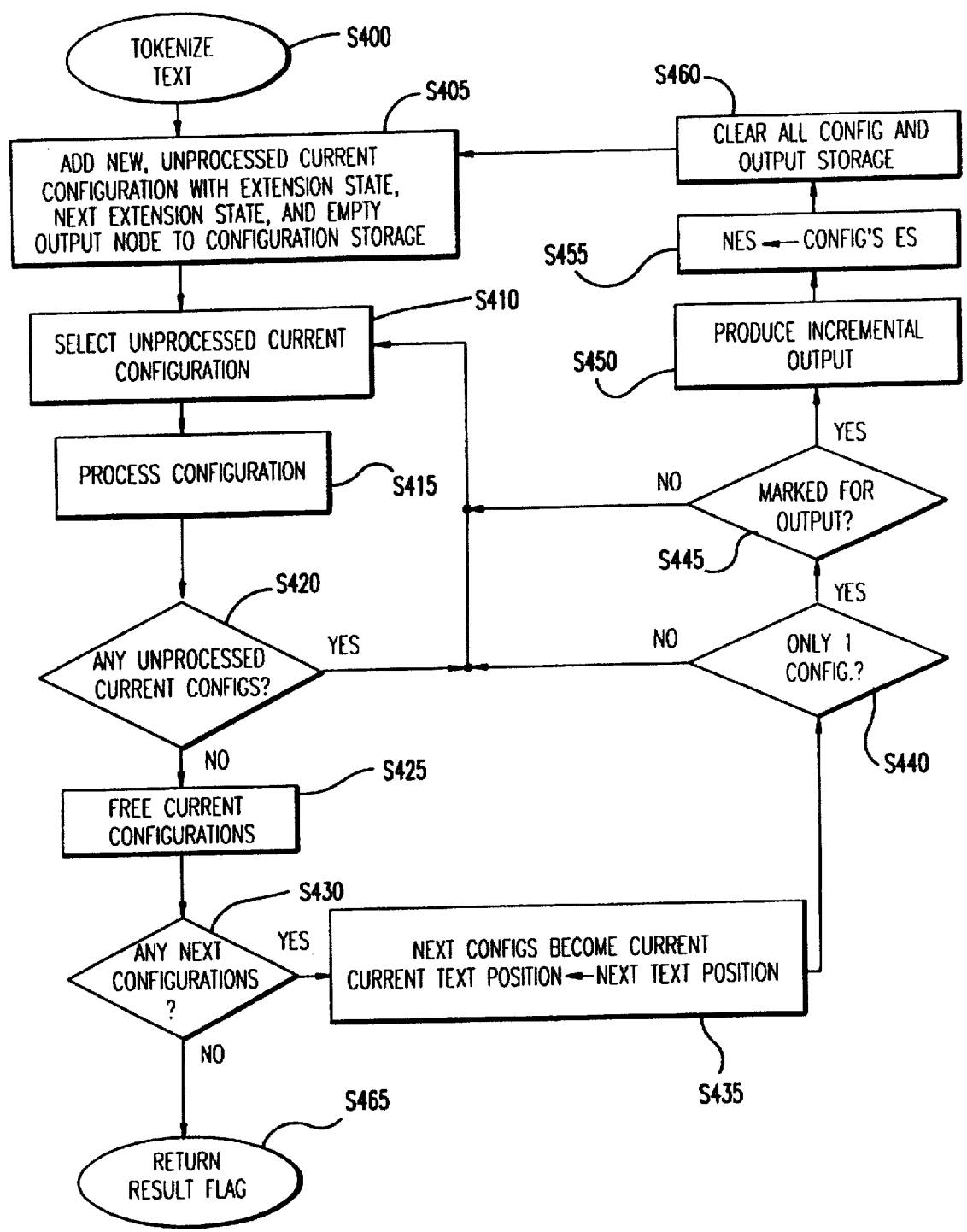
FIG. 3 is a flow chart outlining a preferred embodiment of the step of tokenizing text of FIG. 2.
Figure 4:
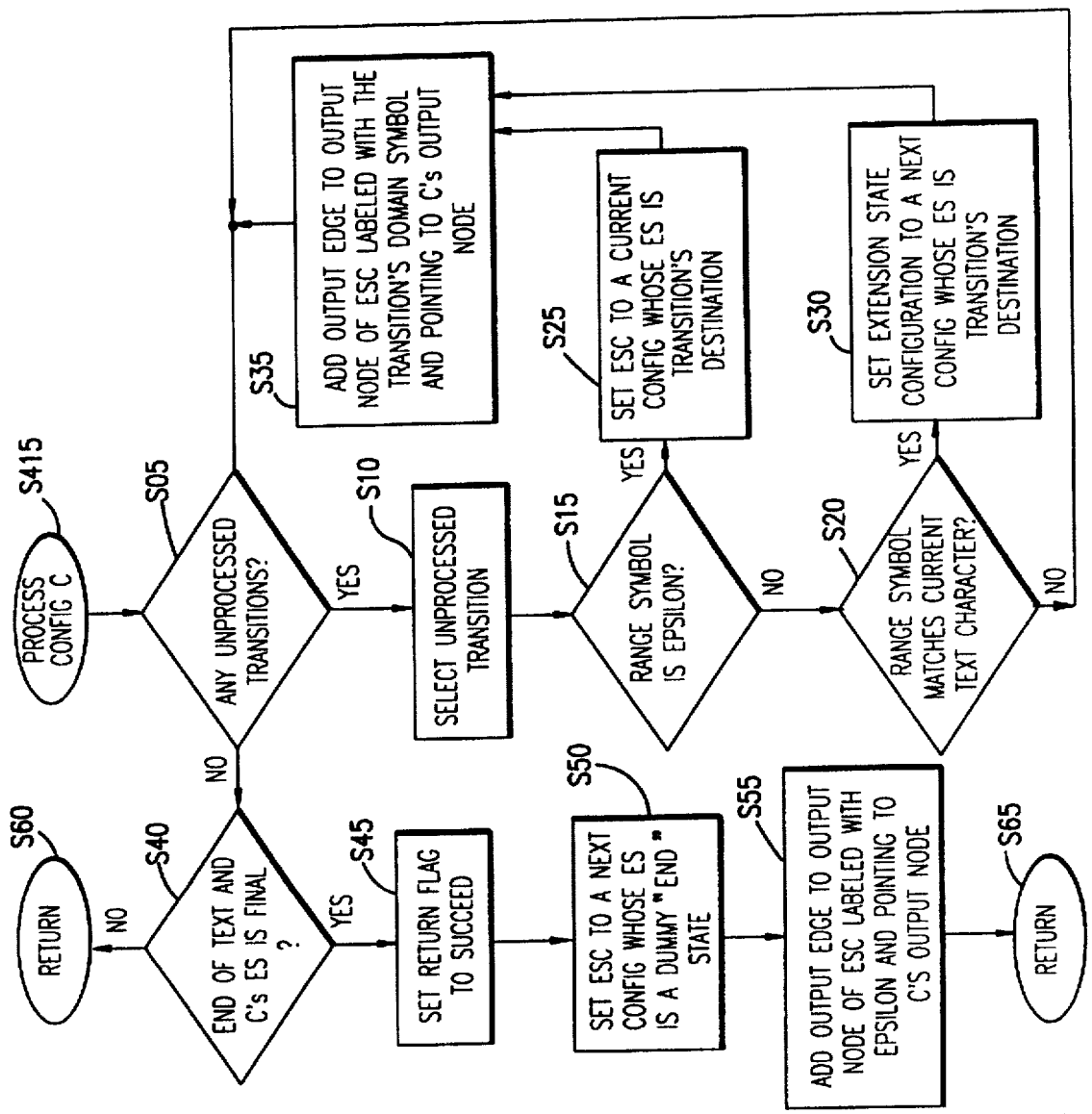
FIG. 4 is a flowchart illustrating the processing operation of processing a configuration.

FIG. 1 shows a schematic diagram for a text tokenizing system 100, which operates according to a preferred method of the invention, as set forth in FIGS. 2, 3, and 4.

The text to be tokenized can be provided in many different ways. One way is shown in FIG. 1, in which a scanner 200 scans a portion of text. The scanner uses known techniques and devices, such as a charge coupled device, to convert a text image to a scanned image. The text is subsequently encoded and recognized by optical character recognition system 300. While the OCR system 300 is shown in FIG. 1 as a separate system, it can be incorporated into the general purpose computer 90.

Recognized text is sent to the general purpose computer 90 for tokenization. Text can also be input from a memory, a computer 500, a LAN 400 or the like. The general purpose computer 90 includes an input/output (I/O) device 80, a text storage unit 10, a tokenizing means 20, which may operate using higher level constraints 21, a path determining means 30, a configuration storage unit 40 and output storage unit 45, comparing means 50, a counting means 60, and a control means 70.

The text tokenizing system 100 is alternately provided by a CPU, microcontroller, a microprocessor, an ASIC or other integrated circuit, on a discrete element hardware circuit or any other conventional control structure known in the art. While the text storage unit 10 and the configuration storage unit 40 are shown in FIG. 1 as independent devices, it should be appreciated that these devices can be provided by different portions of a single storage device, such as a RAM, a non-volative storage device such as a hard disk, optical disk, or a floppy disk, or a flash memory. The text is input at the I/O device 80. The text may be processed as it is input. Alternatively the text may be stored in the text storage unit 10 for later processing.

The tokenizing means 20 is initially input with a text to be tokenized. It creates an initial configuration including an empty node(that is a node with no output edges) as its output node and as its extension state the start state of the transducer 22. The tokenizing means 20 then processes this initial configuration to create new configurations at the next character position. To process a configuration P, the tokenizing means 20 uses the determining means 20 to determine all possible transitions at the configuration's extension state whose range character matches the text character at a current character position. For each matching transition, as determined by the comparing means 50, it obtains another configuration whose output node has an edge to P's output node and that edge is labeled with the domain character of the transition. The extension state of this configuration is the state of the transducer 22 to which that transition leads. If the higher level constraints 21 are available, the tokenizing means 20 may apply these higher level constraints 21 to reject what otherwise may be acceptable transitions. The higher level constraints can include a dictionary or a list of problem words. In English, such a list may merely include multicomponent words and abbreviations that are also words, with the interpretation that token internal spaces and periods are allowed only in these strings.

When all the configurations at the current position have been processed, they are all discarded in order to free memory space in the configuration storage unit 40 and make it available for new configurations. Then attention shifts to the next text position and all the configurations associated with it are marked as current.

The counting means 60 counts the number of stored configurations remaining in the configuration storage unit 40. If only one configuration remains in the configuration storage unit 40, the text tokenizing system 100 determines that a pinch point has been reached. The tokenization output may be sent through the I/O device 80 to the LAN 400 or another computer 500 at this time. If the tokenizer is called as a subroutine of another program, the tokenization output may be returned to that program. Alternatively, the pinch point may be ignored if it does not also correspond to a token boundary and the tokenization process simply continues. Tokenization output may be stored in output storage unit 45 until the text tokenizing system 100 determines that both a pinch point and a token boundary have been simultaneously reached. In any event, the current configurations are then processed. Processing continues in this fashion until there are no remaining configurations.

Whenever the tokenization output is determined, it may be sent to the LAN 400 and/or the computer 500, depending on the particular needs of the ultimate user of the tokenization output.

The text may be processed incrementally by the text tokenizing system 100. The tokenization output may be sent continuously, each time a pinch point or a pinch point/token boundary pair has been reached. This process continues until the entire text has been traversed. Each tokenization output segment is guaranteed to be correct, although, the text may later prove to be globally ill-formed. This situation is recognized when counting means 60 determines that there are no remaining configurations.

FIG. 2 is a flow chart outlining the overall tokenizing method. After the process starts in step S100, the text is input at S200. At S300 several variables are initialized. The result flag variable is initially set to FAIL, the next extension state is set to the start state of T, and the current text position is set to the beginning of the text. In step S400, the text is tokenized. The details of the tokenization are outlined in FIG. 3. After tokenization, control continues to step S500, where the process stops.

FIG. 3 outlines in greater detail the process of tokenizing the text portion of step S400. In step 405, a new unprocessed current configuration is created in the configuration storage unit. As explained above in relation to FIG. 7, a configuration includes an extension state 4, an output node 3, a designation of current or next 2 and a designation of processed or unprocessed 1. The configuration created in S405 will be current and unprocessed, its extension state will be the value of the next extension state variable (which will initially be the start state of the transducer) and its output node will be an empty node. In S410, an unprocessed current configuration is selected from the configuration storage unit. After selection of the unprocessed configuration, the configuration is processed at S415. The processing of the configuration is described in detail with reference to FIG. 4.

After processing a configuration, the configuration storage unit is checked for any remaining unprocessed current configurations at S420. If any current configurations in the storage unit remain unprocessed, S410–420 are repeated until no current configurations remain unprocessed.

When no unprocessed current configurations remain, in accordance with step S420, all current configurations are freed at S425. The freeing of the current configurations results in additional memory space for subsequent processing.

At S430, the configuration storage unit is checked for next configurations. If any next configurations exist, they become current configurations and the next text position becomes the current text position at S435. Alternatively, if there are no next configurations, no more processing can be done and the result flag is returned.

Assuming that there are next configurations, they all become current configurations at S435 and their number is counted by counting means 60 at S440.

If the number of current configurations is greater than 1, steps 410–420 are repeated in order to process the new set of current configurations. Alternatively, if the number of configurations is equal to 1, the process advances to S445 to determine whether output is appropriate. If a configuration is marked for output, incremental output is produced at S450. The configuration's extension state becomes the next extension state at S455 and all configuration and output storage is cleared at S460.

If at S445, it is determined that output is not desirable, S410–440 are repeated until a state is reached at which output is appropriate. The ability to defer output may be especially beneficial when the client has elected not to receive output until a token boundary is reached. Output is allowable if all of the output edges indicate that output is allowed. If only token boundary symbols allow output then output will only appear at token boundaries. If this delay of output is not desirable, then all labels will be taken as allowing output and the answer at S445 will always be "yes".

The processing of a configuration in accordance with S415 will now be described with specific reference to FIG. 4.

After an unprocessed current configuration P is selected from the configuration storage unit as described in reference to FIG. 3, the selected configuration is processed by first determining if any unprocessed transitions are present in S05. In S10, an unprocessed transition is selected.

After selecting the unprocessed transition, the transition is applied at the current text position beginning in S15.

If at S15, it is determined that the range symbol of the transition is epsilon, it is not necessary to continue to S20 to check for a match. At that point, an extension state configuration is set equal to a current configuration having an extension state identical to the transition's destination. The range character may be epsilon when the effect of the transition is to delete the token boundary between a word and a following punctuation mark. However, this determination is dependent upon the selected tokenizer. A new current configuration is created if one with the required extension state does not already exist in the configuration storage unit; otherwise the existing configuration is obtained.

If the range symbol of the selected transition is determined not to equal epsilon in accordance with S15, the process determines whether the range symbol matches the current text character in S20. If the range symbol does match the current text character, the extension state configuration is set at S30 to a next configuration having an extension state identical to the transition's destination. If a next configuration with the desired extension state does not exist in the configuration storage unit, a new one is created.

If the extension state configuration is obtained at S25 or S30, in accordance with S35 an output edge is added to the output node of the extension state configuration. That edge is labeled with the transition's domain symbol. The output edge points to P's output node. This step ensures that the output strings defined by the tokenization transducer are recorded in the node-edge output graph.

If however, at step S20, the range symbol does not match the current text character, no extension state configuration or output information is obtained and steps S05 through S30 are repeated for any remaining unprocessed transitions.

The aforementioned processing steps are repeated until there are no unprocessed transitions. When all transitions have been processed, the end of text may have been reached. If the end of text has been reached and P's extension state is final in accordance with S40, the return flag is set to SUCCEED in S45.

To finalize the processing, the extension state configuration is set to a next configuration in step S50 having as an extension state a dummy "end" state. An output edge is then added to the output node of the extension state configuration labeled with epsilon in S55. This edge is labelled with epsilon and marked for output in S55. The edge points to P's output node. Then at box S65, return goes to S420 of FIG. 3. This arrangement ensures that a pinch point will be detected at S440 and this will cause output to be produced for the last segment of the text.

If at S40, the end of text has not been reached or the state is not final, S60 causes a return to the configuration processing at S420 of FIG. 3. Whether the return to S420 is from S60 or S65, further unprocessed configurations can then be processed.

The operation of the process outlined in FIGS. 2 through 4 can be more easily understood by applying the process to some examples.

Figure 9:
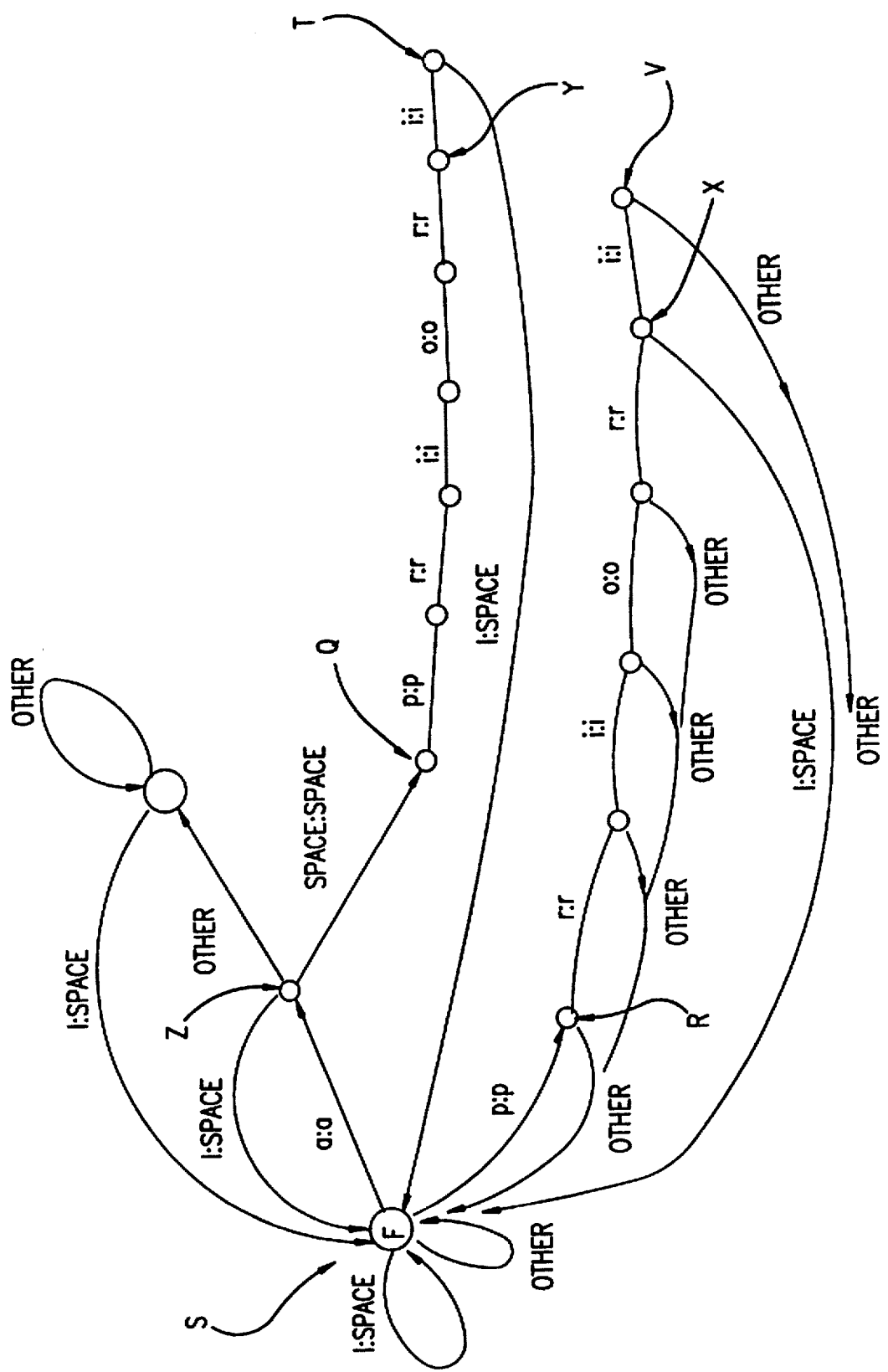
FIG. 9 is a graph showing the subsection of a tokenizing transducer that is relevant to the strings "go for", "a priori", "prior", and "a person"

FIG. 9 shows the subsection of a simple tokenizing transducer T containing the transitions that will be used for most of the following examples. In this diagram, state S is the start-state, and the F inside it indicates that it is also a final state. This tokenizer includes some higher-level constraints: it shows in particular that "a priori" is a multi-component word but that "priori" not following "a" is not permitted. The label "other" on a transition at a particular state stands for all pairs of identical letters (e.g. b:b, c:d . . . but not space:space or other identical punctuation marks) except for the identical pairs that are shown explicitly at that state. Thus the "other" at the start-state indicates that there are "g:g", "o:o", "f:f" and other such transitions looping from and to that state. Also, these examples assume that only transitions whose domain symbol is the token-boundary "|" are marked for output.

Figure 8:
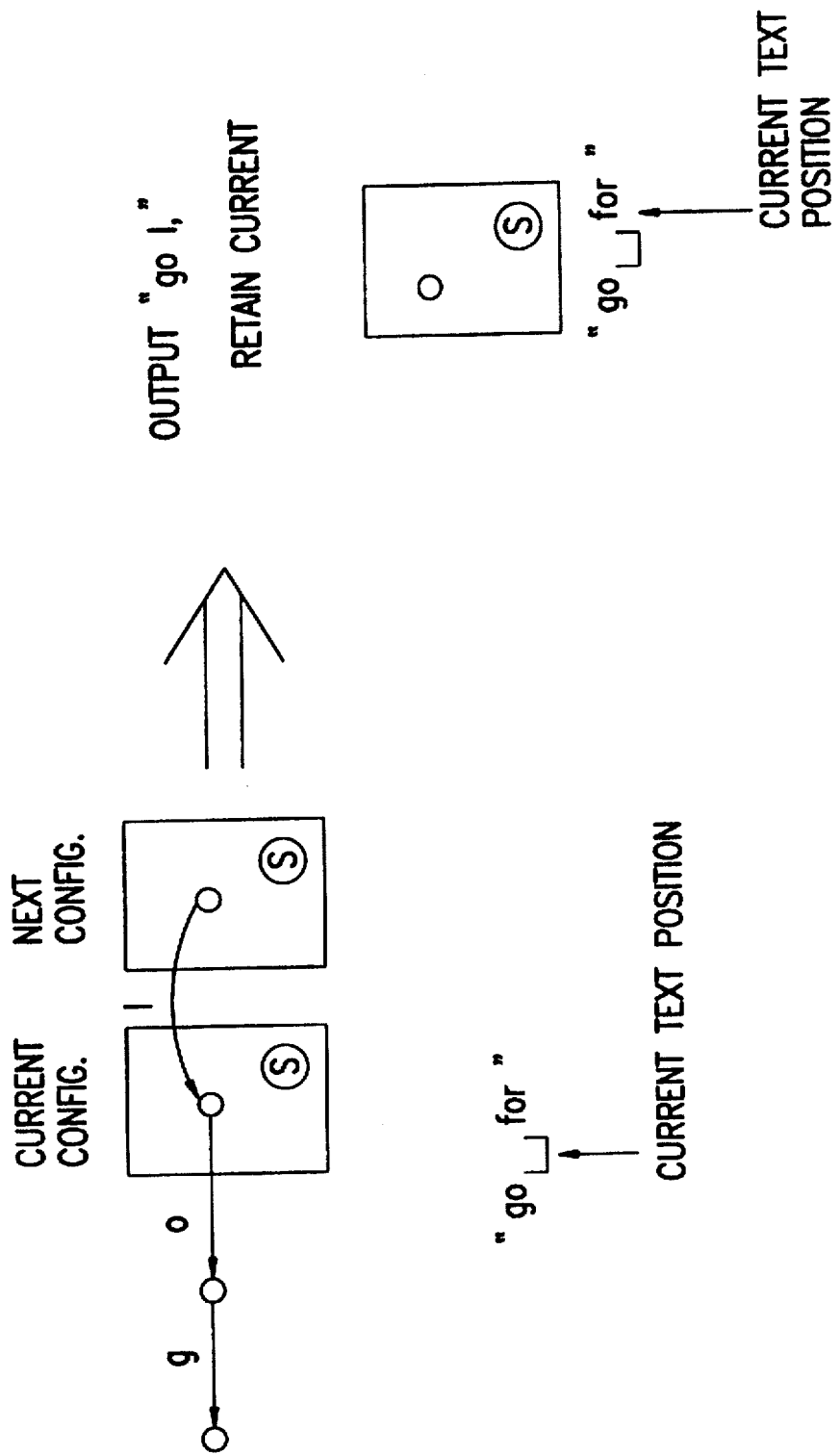
FIG. 8 illustrates processing of "go for"

The process is easily understood through the use of a simple example employing the phrase "go for." This example is illustrated in FIG. 8.

The process starts at S100 and the text "go for" is input at S200. At S300, the next extension state is set to the start state of T, the state labeled "S: in FIG. 9, the result Flag is set to FAIL, and the current text position is at the beginning of the text.

Beginning with the current text position, in this case the position corresponding to the character "g", the text is then tokenized in accordance with S400.

An unprocessed configuration is added and is selected from the configuration storage unit in accordance with S410.

The configuration is then processed at S415. For the character position corresponding to "g", there is a transition with a range symbol that matches the current text character at S20. This "g:g" transition is indicated by the "other"-labeled transition at state S. An extension state configuration is defined and set to a next configuration at S30. At S35, the output edge labeled with the domain symbol g is added, pointing in the direction of the output node. No other transitions at state S match against the "g" at the current character position.

When no unprocessed transitions remain for a given current configuration, in accordance with S05, and if more text remains at S40, the process returns to S420 to check for any remaining unprocessed current configurations. In this case no such configurations remain and the single next configuration becomes current at S435. It is determined at S440 that there is only one current configuration, but because "g" is not the token-boundary it is not marked for output (S445) and it is then selected for processing at S410.

The unprocessed transition labeled "other" is eventually again selected in accordance with S05 and the aforementioned steps are repeated for the letter "o". Therefore, another output edge is added and is labelled with the domain symbol "o" as shown in FIG. 8.

When the space character is reached, a different scenario occurs. In this instance, the range symbol is space at S15. At this point, the space character is processed in exactly the same manner as the "g" described above. However, it is determined that the space represents a token boundary. Since a token boundary has been reached, the configuration is found to be marked for output at S445.

In case it is determined at S445 that the single configuration is marked for output, then the incremental output is produced at S450. The output graph containing "gol" is produced (possibly converted to a conventional finite-state machine as described in relation to FIGS. 6a and 6b), the state of the single configuration is saved as the next-configuration-state at S455 and all output and configuration storage is cleared S460. A new current configuration is then created at S405, with the saved next-configuration-state as its extension state. This is still state S.

The process described above is repeated for the word "for". Output will be possible when the end of the word is reached.

While both the processing and the output graph were simple with respect to the phrase "go for", the tokenizing is much more complicated for a compound word, such as "a priori" as illustrated in FIG. 9.

For the purposes of this illustration, the tokenizer transducer T includes a set of acceptable compound words, and includes the word "a priori". In S405, a configuration for the initial conditions is constructed. That configuration is selected for processing. The configuration is then processed in accordance with the steps illustrated in FIG. 4. A first unprocessed transition is selected in S10.

The transition is processed beginning at S15. The only matching transition is the one whose range symbol is "a", it outputs "a", and a new next configuration is created whose extension state is the destination of that transition, state Z.

Figure 10:
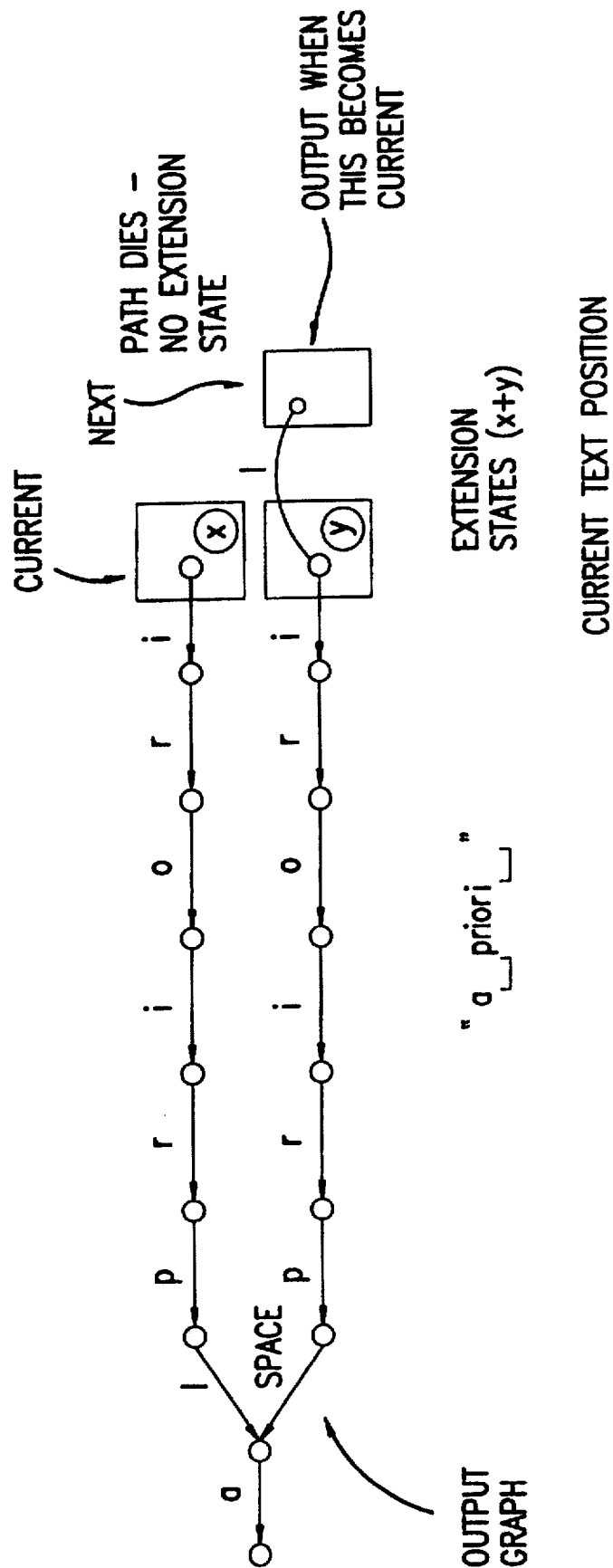
FIG. 10 illustrates the output graph for "a priori."

When that configuration is processed, the space is taken as the current character. Unlike the space after "go" in the previous example, there are now two transitions whose range symbol is space. One outputs the token boundary, as would be appropriate if the string continued as in "a man". The other has a space as its domain symbol, on the hypothesis, true for this example, that the "a" is the first part of the compound "a priori". Each of these transitions matches at S20, and this results in the creation of two next configurations. FIG. 10 includes the output edges that result from processing these transitions. These next configurations become current at S435, but at S440 it is determined that there are two current configurations. Thus no output processing is considered, even though one of these configurations (the one with the token boundary at the output graph) is marked for output. The existence of the two configurations means that this is not a pinch point.

The aforementioned steps are repeated for the next character "p", and are repeated for each character "r", "i", "o", "r" and "i" until the space after "i" is found.

Two configurations are processed at each character position and this results in two separate paths A and B in the output graph. When the space is reached, state T in FIG. 9 is the extension state of one of the current configurations and state U is the extension state of the other. The space matches the range character at the single transition at state T and this results in a next configuration and a new output edge labeled with the token boundary indicating that the compound token "a priori" has been recognized. On the other hand, the space does not match the single "other" transition at state U and no next configuration is created on that path. This is indicated in FIG. 10 by the annotation that the upper path is "blocked", reflecting the fact that the tokenizing transducer in FIG. 9 includes the higher-order constraint that "priori" is not allowed as a separate token. When both configurations at the space have been processed, the single new next configuration becomes current at S435. Since there is only one configuration and it is marked for output (since the only outgoing edge of its output node is the token boundary), a pinchpoint has been reached so that the output "a priori" is produced and storage is cleared at S450 and S455. Processing then continues at S405.

Figure 12:
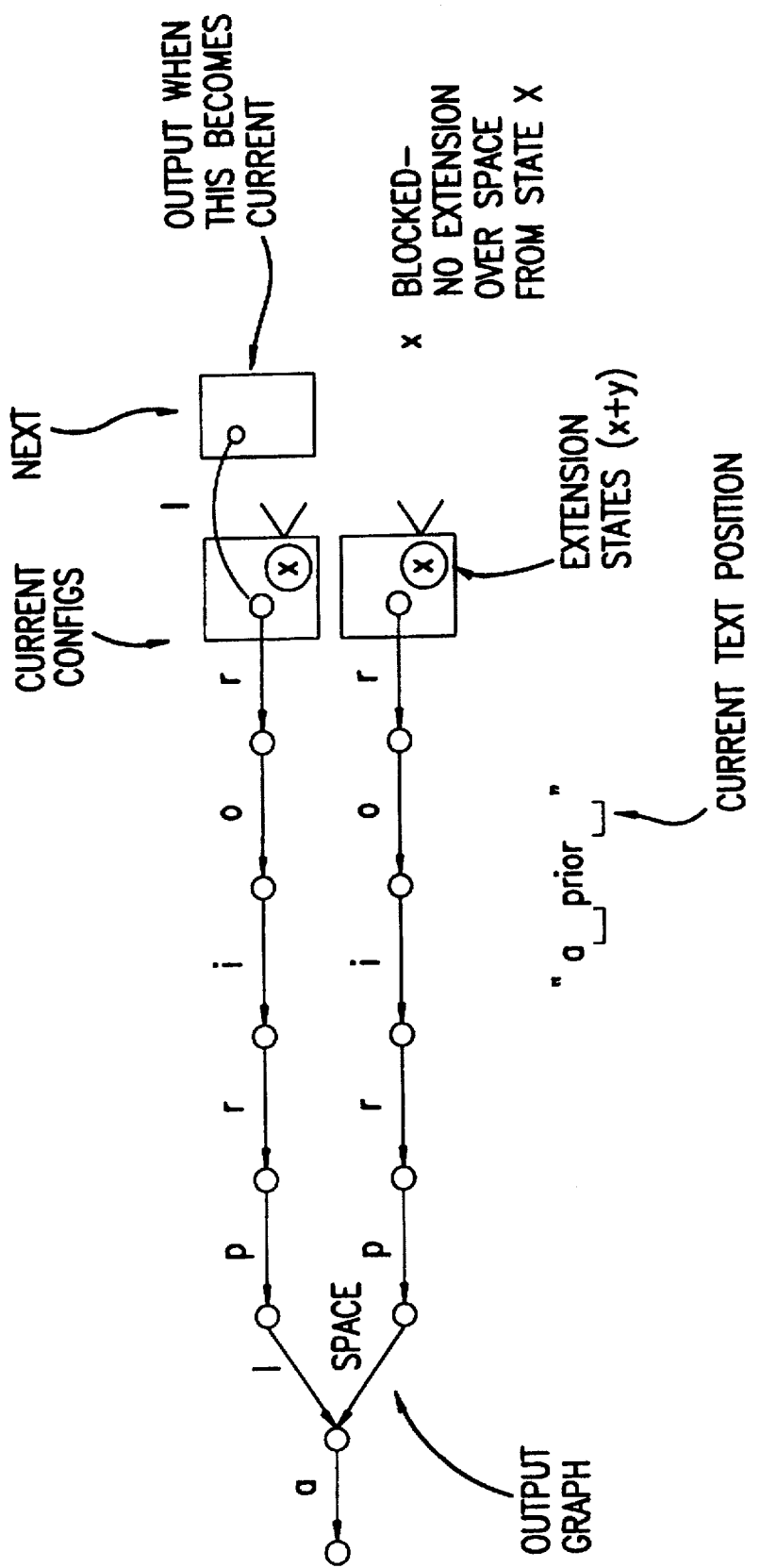
FIG. 12 shows the tokenization of "a prior"
Figure 13:
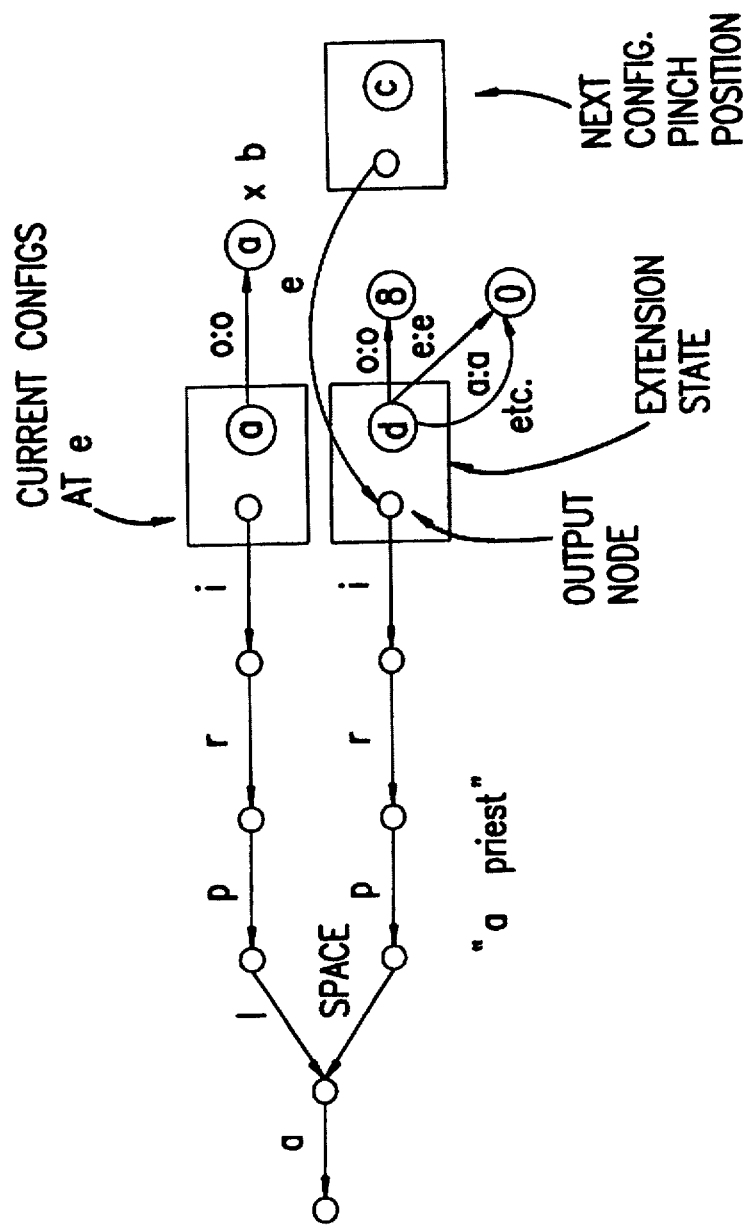
FIG. 13 illustrates the tokenization of "a priest"

As one variation on the preceding example, consider the tokenization of "a prior", as illustrated in FIG. 12. In this example the same two paths are created until after the current configurations at the second "r" are processed. One of the configurations has state Y as its extension state (on the hypothesis of that the string is the compound "a priori"), the other has state X (on the hypothesis that the string contains the token "a" followed by a separate token that beings with "prior" but which is not followed by only a single "i"). In this example, the configuration at state Y is blocked because the space after the "r" does not match the single "i:i" transition. A next configuration is created for the other configuration, however, because the space matches the |:space transition at state X. A pinchpoint results and the token sequence "a|prior|" is produced. Note that the token "a" was not produced when its character was first matched because an ambiguity was created that could not be resolved until more text characters had been processed.

In these examples, the pinchpoints where the ambiguity is resolved are also configurations that are marked for output (since they have token-boundary output edges). Thus, the output is produced as soon as all confusion has been eliminated. This is not the case for other examples, however. This is illustrated by the tokenization of "a person" as presented in FIG. 11. In this example, path B was maintained until it became clear that a compound word was not found. C is illustrative of a current configuration and N is illustrative of a next configuration. Path A proves to be the correct path. On the assumption that output is allowed only at token boundaries, no output will be produced until the space at the end of "person" has been reached. At that time the token sequence "a|person|" would be provided. But it is clear once the "e" is encountered that "a|" is unambiguously a distinct token, and a client may derive some benefit by receiving it and beginning to operate on it before processing of the additional characters "rson" has been completed.

Figure 11:
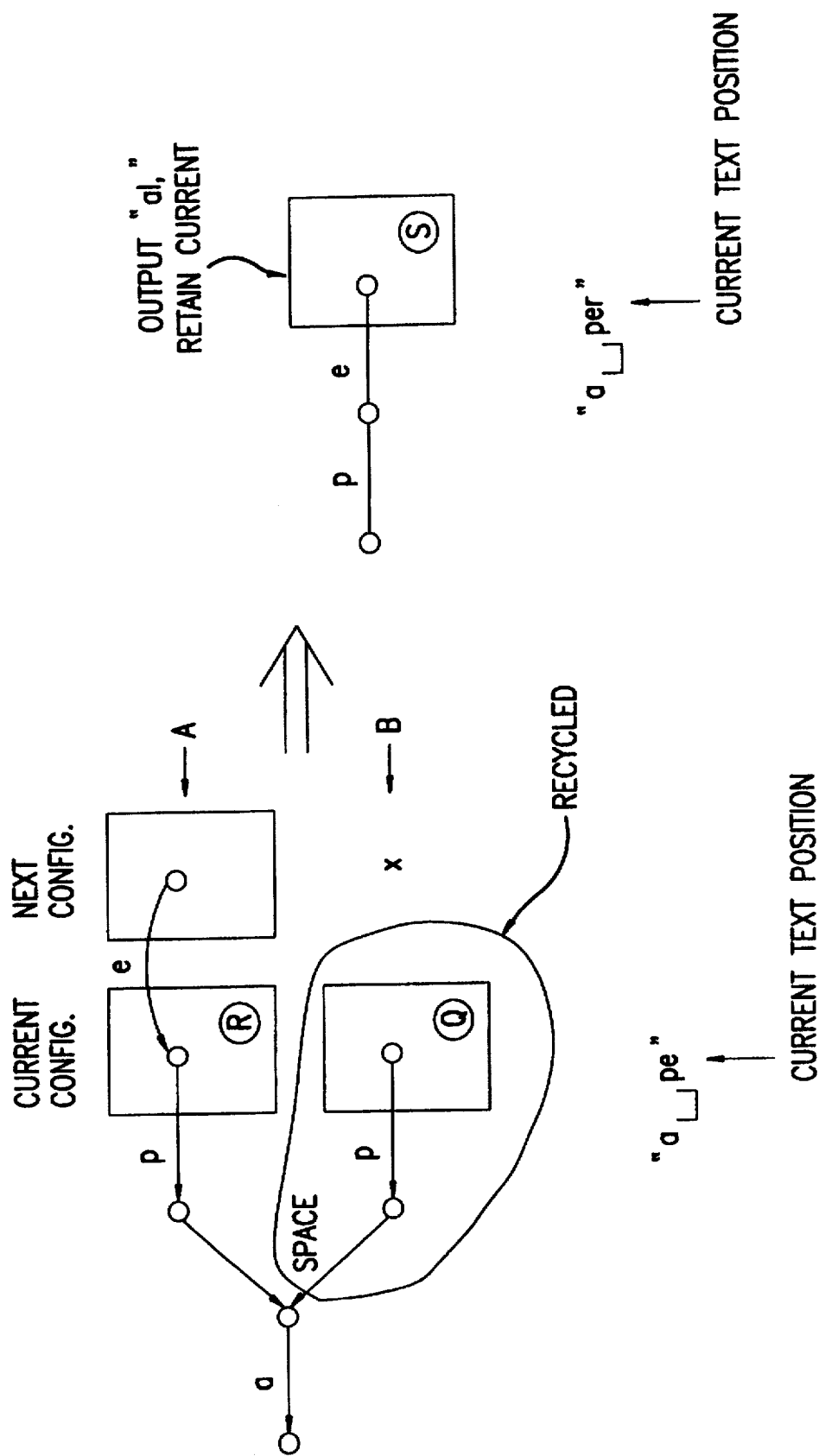
FIG. 11 shows the tokenization of "a person"

To enable this advantage, FIG. 11 illustrates a technique for producing the output "al" as soon as the ambiguity is resolved but without waiting until the next output-marked configuration is reached. After the path representing the compound "a priori" is blocked at the "e" and the configuration from the other path becomes current, it is determined at step S440 that there is only one configuration. The test at Box S445 does not allow for output, but a further computation can be executed at this point to locate earlier token boundaries that are no longer ambiguous.

The path of output edges can be traversed backwards from node to node, starting at the configuration's output node, until either an edge labeled with a token boundary is reached or a node with more than one output edge is encountered. If a multi-edge output node is reached before a token boundary, then any token boundaries may still be embedded in the ambiguities represented by those several output edges, and no output can safely be produced. But if a token-boundary is reached by following a path of singleton edges, then there is no longer an uncertainty about that boundary, and the output graph leading backwards from that can safely be produced as output. This is illustrated in FIG. 11. The path backwards from the N configuration traverses the "c" and "p" edges and then reaches the token boundary "|". The token "al" can be produced as output and the nodes and edges of that part of the output graph can be collected for reuse. The traversed "p" and "e" edges are retained in the output graph accessible from the configuration, and that will then be processed at S410.

Thus, it can be seen that whether a path has transitions at a given point is dependent on the tokenizer T and any higher level information sources. The selection of the tokenizer T is dependent upon the particular language and the intended application of the tokenized text.

To complete the illustration of the tokenization processing steps, the processing of the text "walk," will be described. The tokenized output for this string is "walkl,|", where a token boundary has been inserted before the comma and the final space is also converted to a token boundary. This is accomplished by means of an epsilon-labeled transition in the tokenizing transducer T.

Figure 14:
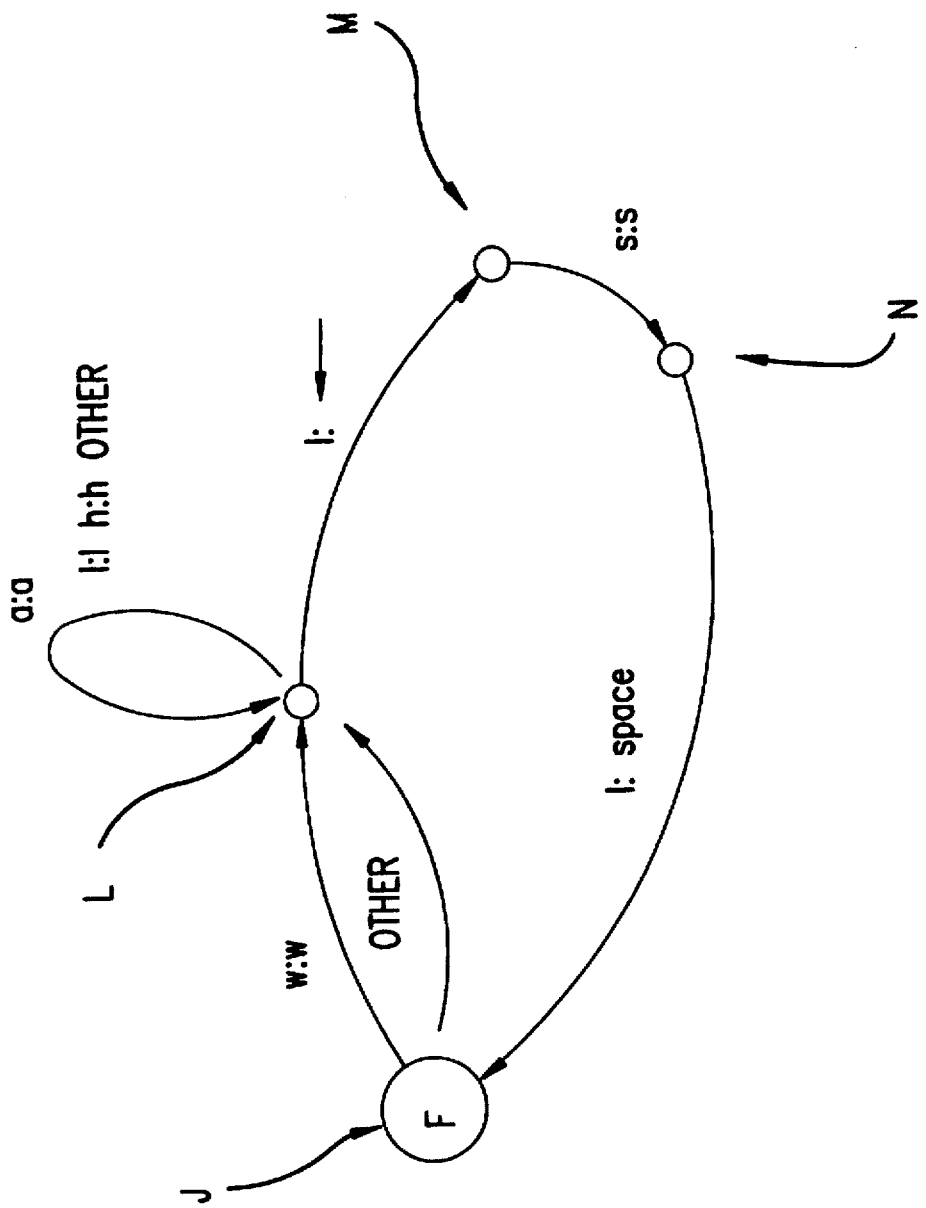
FIG. 14 illustrates a subsection of the tokenizing transducer for "walk"

FIG. 14 shows a subsection of T that is relevant to this example. Again, the state labeled S is the start-state. It has transitions for the various first characters of a word (e.g., the "w:w" transition), and those transitions lead to the state L whose transitions cover the second and subsequent characters. There is also a path from L through M and N that allows for the comma-space sequence. The fact that the comma path comes out of state L instead of S embodies the constraint that the comma, as a trailing post-word punctuation mark, must come after at least one letter in a word.

Figure 15A:
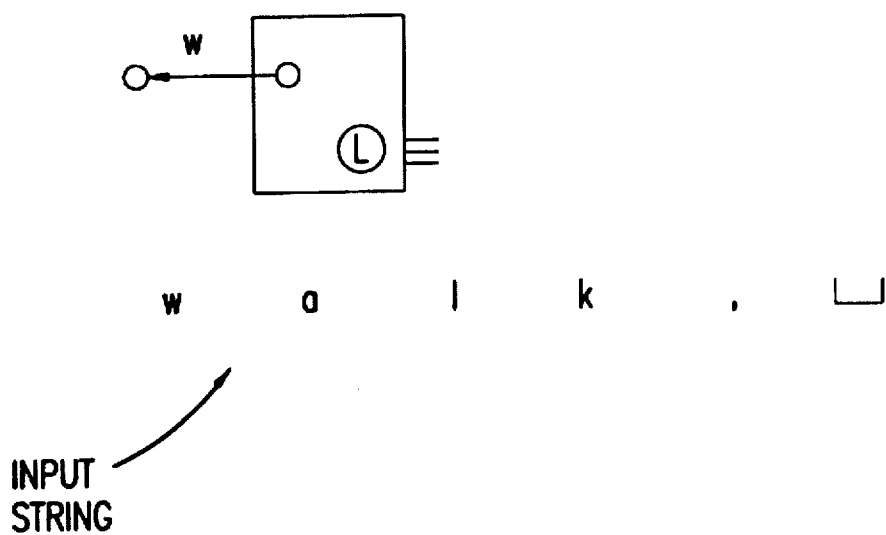
FIG. 15(a) through 15(e) illustrate the tokenization output for "walk".
Figure 15B:
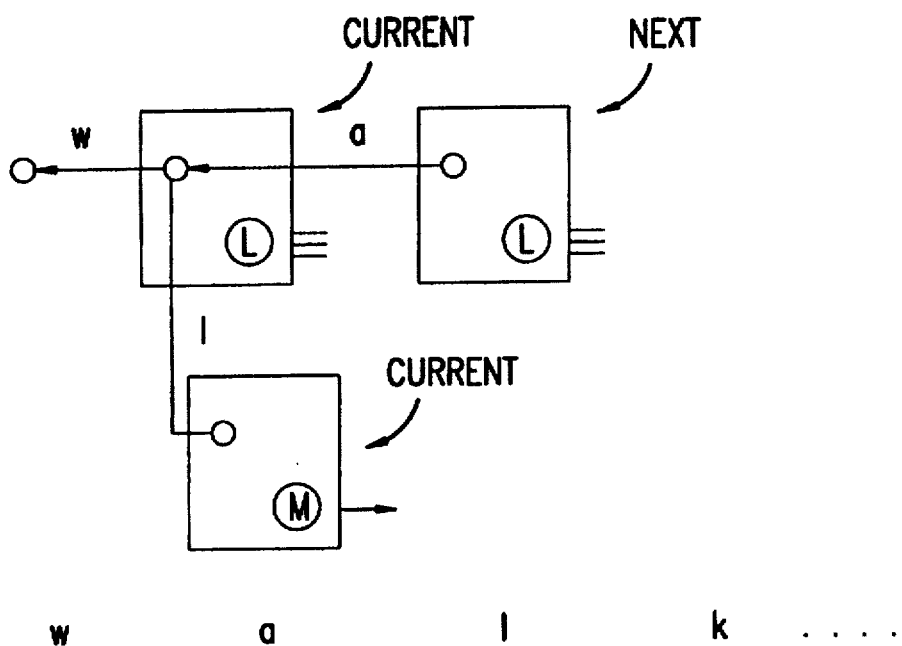

The "w:w" transition at state S is matched at step S20 when the initial configuration is processed, and this leads to the situation diagrammed in FIG. 15(a). There is a single configuration with L as its extension state and with "w" encoded in its output graph. The "a" is the current character when this configuration is processed. When the "a:a" transition is selected at S10, it matches at S20 and this leads to a next configuration also with extension state L. The output graph of that configuration encodes the string "wa". But when the "|:epsilon" transition is selected, it satisfies the test in S15, and that results in the creation of a new current configuration whose extension state is M. Its output graph encodes the string "wl", on the hypothesis that the text contains a single-letter token followed by a comma (as yet unseen). The situation after processing the configuration in FIG. 15(a) is shown in FIG. 15(b). When all the transitions at state L have been processed at the "w", control returns at S60 to the test at S420. This test determines that there is still an unprocessed current configuration, namely the one created from the epsilon-range transition at state L. That configuration is selected for processing at S410 and processed at S415.

Figure 15C:
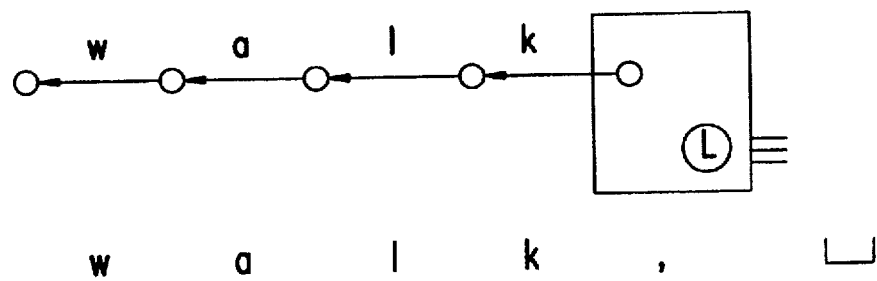
Figure 15D:
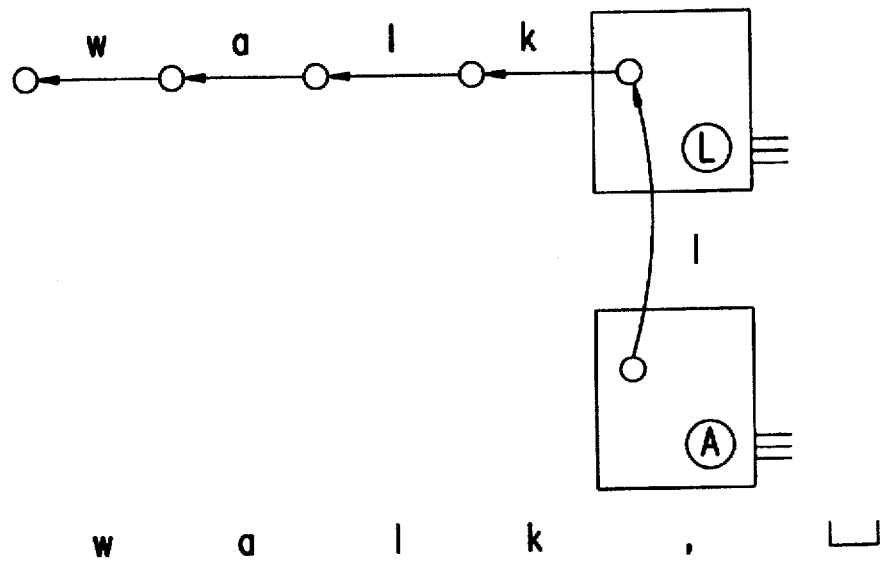

The extension state of that configuration, state M, has a single ",:," transition and that fails to match the current character "a", so processing at state M leads to no new configurations. On return to S420, there are no unprocessed current configurations, so the current text position advances to "l" and the single next configuration becomes current. The processing at "l" goes through exactly the same steps as the processing of "a": a new next and a new current configuration are created, but the current cannot be advanced. The "k" is eventually processed in the same way, leading to the situation in FIG. 15(c). There is again a single configuration with extension state L, and the current ext character is ",". Since there is no transition at L with comma as its range symbol, the only new configuration to be produced is a current one with extension state M, as shown in FIG. 15(d). The output graph from this configuration encodes the string "walkl".

Figure 15E:
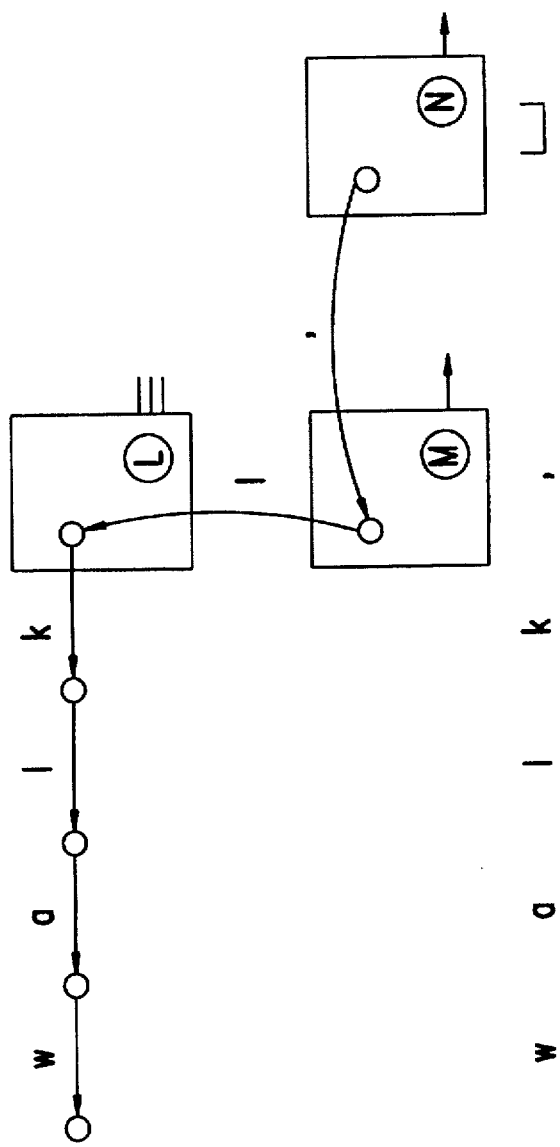

When this configuration is selected for processing, the single transition at state M matches against the comma at the current text position, leading to a new next configuration, as shown in FIG. 15(e). The extension state is N and the encoded output string is "walkl,". The new next configuration becomes current, and the single transition at state N matches the current text character (space) in the familiar way, and finally the output "walkl,|" is produced. This completes the illustration of the processing steps in FIGS. 3 and 4.

As described above, this invention requires only limited storage space. Current configurations are freed at S425 after the processing at each text position is completed, and output storage and the single remaining configuration are cleared and recycled at S460 whenever output is produced at a pinch point. However, as described above, there are some situations where nodes and edges in the output storage are retained longer than is necessary. This happens when an ambiguity is detected, so that the processing proceeds forward along two or more paths of configurations. One of the paths may eventually block and no damage will be done to any further processing if the output edges and nodes unique to that path is cleared and recycled. The situation is illustrated in FIG. 11 with "a prior". When the configuration on the lower path blocks, all of the notes and edges encoding "[space]prior" are no longer needed. Although they would be reclaimed at the next output pinchpoint in any event, the invention allows for easy detection and earlier reclamation of this storage, by means of a simple reference-counting garbage-collection scheme.

Whenever an output edge is added to the graph, a count associated with the node that the edge points to is incremented by one. These reference counts are initialized to zero whenever the output node is created. Thus at any time the count for a node indicates the number of edges coming in to it. If the processing of a given configuration results in the creation of a new configuration, there will be an edge from the output node of the new configuration pointing to the output node of the given configuration, and the reference count of the given configuration's output node will no longer be zero. If, on the other hand, no new configuration is created, the reference count will still be zero, indicating that the path has blocked. If that is the case, then not only can the configuration storage be collected, but so can its output node and all the edges leaving that node. When an edge is collected, the reference count of the node it points to is reduced by one. If this results in a count of zero for that node, then it and the edges leading out of it are also collected, in an iterative process. When this iteration is completed, a set of unneeded nodes and edges will have been returned to free storage and made available for re-use. In the example in FIG. 11, the node that the space and token boundary point to has a reference count of 2, and all others have a reference count of 1. When the lower configuration blocks, its node and the edge labeled "p" are reclaimed, which causes the count of the lower node with the "space" edge to become zero, so it is reclaimed together with the "space" edge, and so on. The iteration stops when the node with the "a" edge is encountered, since its reference count goes from 2 to 1.

The reference-counting garbage collector will collect all storage as soon as possible, provided that T itself is linearly bounded. T will almost always be linearly bounded. That is, there is some constant k such that the length of a domain string is no longer than k times the length of the range string it corresponds to. Linear boundedness is a well-known property that transducers can have (see for example the discussion of linear bounded transducers in Chomsky, Formal Properties of Grammar 1963). T will not be linear bounded if there is a transition or sequence of transitions leading from a given state back to that same state such that all them have epsilon as their range symbol. This will result in a loop in the output graph. The looping transitions will prevent a reference count from going to zero even if the loop as a whole is no longer necessary. In this case, the simple reference-counting technique is not guaranteed to collect all output storage as soon as it is logically possible. However, if T is not linearly bounded, the garbage will still be collected at the next pinch point.

This invention also guarantees that the output at every pinch point is correct in the sense that concatenating together all the outputs delivered at all of the pinch points will result in a set of strings (or the equivalent finite-state machine) that would result from computing the formula Dom(T o Id(text)). If the text as a whole is well-formed, that is, the language denoted by Dom(T o Id(text)) contains at least one string, then the output at every pinchpoint is valid and any further processing done by the client will never have to be retracted. If the text is globally ill-formed (so that there is no valid tokenization of the entire text), then at some point the value FAIL will be returned as the result flag at S465. In that case, the client may have to retract the processing it performed on the output from earlier pinch points. Of course, if the range of T is Sigma*, the set of all strings over the alphabet Sigma, then T will assign a tokenization to every text with characters only in this alphabet. It is easy to determine whether T has this property.

Although it is possible in the text tokenizing system of this invention to output a set of tokenized strings, the tokenization output is generally in the form of a finite state machine as explained above. FIG. 6(a) shows the output graph, which corresponds to the finite state machine going backwards. The finite state machine is shown in FIG. 6(b). For the tokenization output resulting from traversal of "Jan.", the input "Jan." is labeled above the arcs of the finite state machine. The states are represented by the nodes between the arcs of the finite state machine. Three paths exist, one for "Jan." one for "Janl.", and one for "Jan.l.". However, these three paths collapse into one after the period.

It is also possible to provide output in the form of tokenized strings. The tokenization output may also be copied to a graph data structure, for example, an initial chart of a chart-parser for higher level syntactic analysis.

The number of possible tokenizations may be restricted by evaluating the text based on higher level constraints in addition to the tokenizer T itself. Higher level constraints can eliminate inappropriate tokenizations at an early stage of the processing. If the additional constraints can be expressed as regular relations, they can be composed into the original formula to provide a more restrictive tokenization mapping.

If L is a lexical relation that is regular (See U.S. patent application Ser. No. 08/255,504 (now U.S. Pat. No. 5,594,641), "Finite State Transdaption of related word forms for Text Indexing and Retrieval" for further example), and maps sequences of word stem-and-tag strings into the corresponding inflected forms of the words separated by token boundaries, then the result can be expressed as:

$$\text{Dom (L o T o Id(text))} \tag{2}$$

Equation (2) now defines the morphological analysis of the tokenized text. Because composition is an associative operation, Equation (2) can be rewritten as:

$$\text{Dom ((L o T) o Id(text))} \tag{3}$$

Because the lexical relation L and the tokenizer T are independent of the text, the composition "L o T" can be evaluated at compile-time to produce a new transducer "LT" that maps tokenize stems to surface text. Applying the text tokenizing system of this invention to the transducer LT produces the tokenized morphological analysis of the text.

However, even though it is possible to compose the L and T transducers at compile time and that will undoubtedly speed up the tokenization process, it may sometimes be impractical to perform this compilation step. For example, the algorithms for performing the composition may not be available, or the resulting single transducer may be too large to deal with in limited memory. If this is the case, the invention can easily be extended to simulate the composition of the two transducer in the course of carrying out the tokenization. Instead of having a single FST state serve as the extension state of a configuration, the extension state instead will be a pair of states, one from the L transducer and one from T. The step of matching a transition will be generalized so that a new configuration is created if the range character of a T transitions matches the text, and if the corresponding domain character matches the range character of a transition at the L state paired with that T state. The output edge will be labeled with the domain character of the L transition. The resulting output graph will represent only the strings that would come from tokenizing the text with T and passing the result through the lexical relation L.

The output resulting from the above representation will depend upon the extent of the higher level constraints L. L may be an extensive dictionary for providing complete morphological analysis of the text. If a complete analysis is not desired, the tokenizing relation may be augmented by providing a small amount of additional information.

The small amount of information serves to control the rampant ambiguity that comes from letting every space be construed as expressing either a token boundary or the internal space of a multi-component word, and from letting every period be interpreted as marking either a sentence boundary or an abbreviation.

In Equation (4), M is a list of known multi-component words and A is a list of acceptable abbreviations. X is the set of all strings not containing either a space or a period. The regular language "XAM" is the union of X, A and M. The strings in this language do not contain spaces or periods unless they are in M or A. The relation of Equation (4):

$$Id([XAMl]*XAMl) \circ T \qquad (4)$$

can be used as a tokenizing relation that produces space/period ambiguities only for the strings contained in M or A.

Whether or not higher level constraints are available to restrict the output, Sproat's (previous reference) proposal of using weighted transducer can be adapted to this invention. Sproat added weights to the transitions of the tokenizing transducer, where the weights are interpreted as the negative of the logarithms of the probability or likelihood that a given transition should be taken. He proposes to apply a BestPath function so that the result of tokenizing is given by the formula (allowing for the fact that Sproat interchanges the domain and range sides of T).

$$BestPath(Dom(T \circ ID(text))) \qquad (5)$$

BestPath chooses as output the strings that are produced by the sequence of transitions whose weights given the greatest number when added together. The pinchpoint computation of our invention guarantees that each of the strings output at one pinchpoint can go together with any of the strings at all other pinchpoint outputs. Thus, the best path through the whole text will necessarily be the concatenation of the strings chosen as the best paths at each pinchpoint output. It is obvious, then, to extend our invention to compute Sproat's best path tokenization in an incremental way. We simply record the weights from T's transitions on the output edges that they cause to be created, so that the weights ave available to carry out the BestPath computation at every pinch point.

While this invention has been described in conjunction with specific embodiments outlined above, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method for tokenizing text with a tokenizing transducer comprising the steps of:
   (a) storing all current configurations including at least one current configuration in a configuration storage unit, the at least one current configuration including an extension state and an output node;
   (b) selecting one said at least one current configuration that has not been processed;
   (c) processing said selected current configuration wherein processing includes creating any next configurations;
   (d) repeating steps b and c until all of said current configurations have been processed;
   (e) freeing all of said current configurations;
   (f) redefining all of the any next configurations as current configurations and the next text position as the current text position;
   (g) counting said current configurations; and
   (h) providing output when exactly one next configuration exists.

2. The method of claim 1, further comprising the step of providing output in the form of a finite state machine.

3. The method of claim 1, wherein the processing step comprises:

selecting any unprocessed transitions from the extension state of the selected configuration;
   determining a range symbol; and
   setting an extension state configuration based on the range symbol to one of a current configuration and a next configuration.

4. The method of claim 3, wherein the extension state configuration has an extension state that is the destination of the selected transition.

5. The method of claim 4, wherein the extension state configuration is set to the next configuration when the range symbol matches the current text character and is set to the current configuration when the range symbol is equal to epsilon.

6. The method of claim 5, wherein said processing step further comprises adding an output edge to an output node of the extension state configuration and labelling said output edge with a domain symbol of the selected transition, said output edge pointing to the output node of the selected configuration.

7. The method of claim 6, wherein said processing step is repeated until all of said any unprocessed transitions have been processed.

8. The method of claim 1, wherein said step of providing output occurs when the one next configuration is marked for output.

9. The method of claim 8, wherein said one next configuration is marked for output only if all output edges at its output node are labelled with a token boundary.

10. The method of claim 1, further comprising:
    defining all possible paths including at least one path in steps a–f;
    ending a path prior to reaching an end of text; and
    deleting said path in order to free storage space.

11. The method of claim 1, further comprising providing output in the form of a finite state machine having edges pointing to output nodes.

12. The method of claim 1, wherein said step of providing output comprises outputting a best path.

13. The method of claim 1, wherein after said step of providing output, the output is deleted from storage.

14. The method of claim 1, wherein the tokenizing transducer is defined by the following rules:
    a. .→epsilon/_|.
    b. |→epsilon/_punctuation
    c. space→white-space+; and
    d. |→white-space+.

15. The method of claim 1, wherein said tokenizing transducer is created by the steps of:
    defining punctuation conventions; and
    defining higher level lexical information.

16. The method of claim 15, wherein the higher level lexical information includes a list of compound words and a list of abbreviations.

17. The method of claim 15, further comprising the step of composing the higher level lexical information with the tokenizer to form a finite state transducer.

18. The method of claim 15, further comprising:
    representing said higher level lexical information as a transducer H;
    pairing said tokenizing transducer with H to create acceptable states;
    selecting any unprocessed transitions from the extension state of the selected configuration;
    determining a range symbol;

determining if said range symbol matches a current text character; and determining whether said transition results in an output edge that has one of the acceptable states if the range symbol matches the current text character.

19. A system for tokenizing text, comprising:

an I/O device for inputting recognized text and outputting tokenized text;

control means for selecting recognized text and for selecting tokenized text to be output;

a tokenizing means for defining configurations each of said configurations comprising, an output node;

an extension state;

a designation of one of current and next; and a designation of one of processed and unprocessed;

determining means for determining all possible transitions at the extension state of each of said configurations;

comparing means for comparing a range character with a current text character wherein said determining means defines a path based on the comparison;

a configuration storage unit for storing the configurations; and an output storage unit for storing the tokenized text.

20. The system of claim 19, further comprising counting means for counting a number of configurations remaining in the configuration storage unit, wherein when the number of remaining configurations is exactly equal to one, the I/O device outputs the tokenized text.

21. The system to claim 19, wherein the tokenizing means comprises a tokenizing transducer defined by the following rules:

a. .→epsilon/__|.

b. |→epsilon/__punctuation c. space→white-space+; and d. |→white-space+.

22. The system according to claim 19, wherein the tokenizing transducer includes punctuation conventions and higher level lexical information.

23. The system according to claim 22, wherein the higher level information includes a list of compound words and a list of abbreviations.

24. The system according to claim 22, wherein the rules are composed with the higher level lexical information to form the tokenizing transducer.

* * * * *